Aug. 3, 1965  R. A. MUNSE  3,198,232
FRONT MOUNTING CLIP WITH SPRING ARM
Filed April 18, 1963
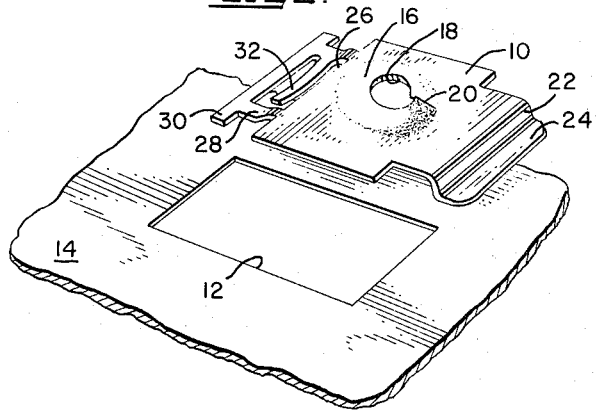
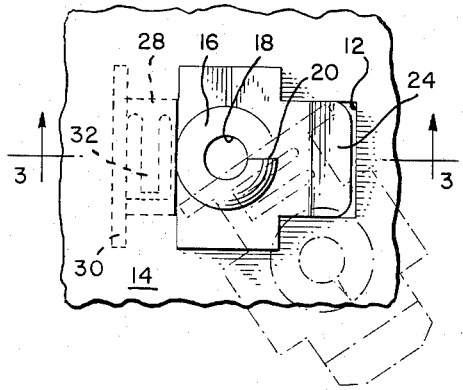
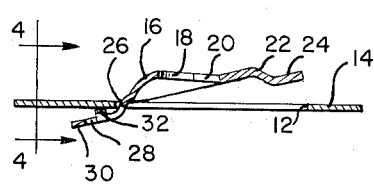
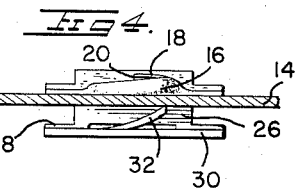
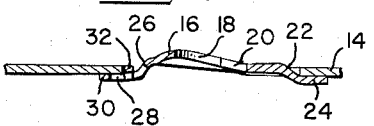
INVENTOR
ROBERT A. MUNSE
BY *Malcolm W. Fraser*
ATTORNEY

United States Patent Office 3,198,232
Patented Aug. 3, 1965

3,198,232
FRONT MOUNTING CLIP WITH SPRING ARM
Robert A. Munse, Perrysburg, Ohio, assignor, by mesne assignments, to The Bishop and Babcock Corporation, Toledo, Ohio, a corporation of Ohio
Filed Apr. 18, 1963, Ser. No. 273,986
3 Claims. (Cl. 151—41.75)

This invention relates to a sheet metal front mounting clip or fastener applicable to an apertured panel in such manner that it is held in place in the aperture preparatory to receiving a screw extending through an aperture in another panel for connecting the panels in assembled relation. Fasteners of this type are presently in use in large quantities in the automobile, refrigerator and stove industries as well as elsewhere and are in the main satisfactory for the purposes. One such fastener is illustrated and described in United States Patent No. 2,908,311, dated October 13, 1959, entitled "Fastener".

An object is to produce a simple and efficient front mounting clip which can be readily mounted on a supporting panel and is satisfactorily secured in position preparatory to receiving a screw despite deformation or unevenness of the panel.

Another object is to produce a novel front mounting clip which is applied from one side of a panel through an aperture therein and automatically accommodates itself to different panel thicknesses so that the same clip can be used to advantage on different panels.

A further object of this invention is to improve fasteners of the above type so that they can be manufactured more efficiently in large quantities and can be applied to panels in position of use more readily and without liability of excessive marring or scratching a relatively soft metal finish, or an enameled or painted surface of the panel to which they are applied.

Other objects and advantages of the invention will become readily apparent from the following detailed description of various modifications of the invention when considered with the accompanying drawings in which:

FIGURE 1 is an exploded perspective view of a fastener incorporating the principles of the invention preparatory to being applied to an aperture in an associated supporting panel;

FIGURE 2 is a top plan view of the fastener and the supporting panel illustrated in FIGURE 1 showing the fastener inserted in an assembly opening in the panel in the preliminary stages prior to its final positioning relative to the assembly opening;

FIGURE 3 is a sectional view of the fastener and supporting panel taken along line 3—3 of FIGURE 2;

FIGURE 4 is a sectional view of the fastener and supporting panel taken along line 4—4 of FIGURE 3; and FIGURE 5 is a sectional view of the fastener and associated supporting panel with the fastener mounted in position of use.

In the illustrated embodiment of the invention, there is shown a fastener or front mounting clip having a sheet metal body portion 10 which is considerably wider than the narrow dimension of the assembly opening 12 formed in the supporting panel 14. As illustrated, the assembly opening 12 provided in the supporting panel 14 is elongate and rectangular. It will be observed that the body portion 10 overlaps the opposite sides of the assembly opening 12 on the inner side of the panel 14, as clearly shown in FIGURE 2. In the illustrated embodiment of FIGURES 1 to 5, the body portion 10 of the fastener is formed with a frustoconical protuberance 16 having a screw-receiving opening 18 in the shape of a helix and a radial slit 20. The specific fastening means of this type is well known to those skilled in the art and further description thereof is not deemed necessary. It will be understood that a separate nut or other screw-receiving means may be carried by the body portion 10 without departing from the spirit of the invention.

At one end of the body portion 10 is a relatively narrow end wall 22 which extends downwardly at a substantially right angle to the body 10. Integral with the end wall 22 and extending at a right angle thereto is a relatively short tongue 24, the corners of which are curved or cut off at an angle.

At the opposite end of the body portion 10 is an end wall 26 which is turned downwardly at substantially a right angle to the body 10 and is of substantially the same length and width as the end wall 22. Integral with the lower end of the wall 26 and extending longitudinally at a right angle thereto is a relatively flat neck portion 28. Integral with the neck portion 28 is a T-shaped terminal portion 30 which forms a continuation of the neck portion but which extends laterally in opposite directions a distance approximately equal to the side edge portions of the body 10.

A generally U-shaped section of metal is cut out of a portion of the neck portion 28 leaving an elongate resilient arm 32 having a length of at least equal to three times the width thereof. The elongate arm 32 is formed to normally extend upwardly out of the plane to the neck portion 28 and thereby functions as a resilient spring arm as will be more fully appreciated hereinafter. The elongate spring arm 32 is integral with the neck portion 28 at a point intermediate the end wall 26 and the T-shaped terminal portion 30. It will be appreciated that one of the slots or openings formed by the removal of the U-shaped section of metal resides in the zone of the juncture between the end wall 26 and the neck portion 28. By removing the metal in this zone the resiliency of the neck portion 28 with respect to the body portion 10 and the tongue 24 is greatly increased, while not affecting the overall strength of the fastener.

In applying the fastener to the supporting structure, the T-shaped terminal portion 30 is grasped and the body portion and associated structure is inserted through the larger dimension of the rectangular assembly opening 12 so that the screw-receiving protuberance 16 is uppermost. Thereafter the fastener is rocked to position, the body portion 10 on the upper side of the supporting panel 14, the reduced neck portion 28 enabling the fastener to be so positioned. The fastener is rocked to locate the tongue 24 in registry with the opening as indicated in FIG. 2. In this position, the extended end of the elongate arm 32 engages the underside of the supporting panel 14 (as clearly illustrated in FIG. 4) and the end wall 26 is in contact with or close to its respective end of the opening 12 of the panel 14. At this point it will be appreciated that since the length of the 32 arm is equal at least to three times the width, an effectively long lever arm has been created which requires little torque to effect downward movement thereof against its normal resiliency.

The next operation is to shift the fastener bodily toward the opposite end of the opening 12 and in such manner as to move the tongue 24 into overlapping engagement with the underside of the supporting panel 14 in the region of the opposite edge of the opening. To accomplish the positioning of the tongue 24 in overlapping relationship with the underside of the panel, force is applied against the spring tension of the elongate arm 32 to rock the fastener about the arm 32, to compress the arm 32, and simultaneously move or shift the fastener in a direction to effect the desired overlapping relation of the tongue 24 with the inner surface of the panel. In accordance with the invention, some flexing of the fastener may occur in the region thereof where the end wall 26 has been made more resilient by the removal of the metal adjacent the elongate arm 32. As a general rule, the fastener may be properly seated within the assembly opening 12 by merely moving the fastener about the elongate arm 32 against the spring pressure thereof. It will be appreciated that although in practice the fasteners of the type described herein are relatively small, the length of the lever arm of the elongate arm 32 is relatively large, thereby requiring a relatively small amount of force to flex the arm 32 in seating the fastener in the panel 14.

The final shifting movement of the fastener is limited by the end wall 22 which moves into engagement with the one edge of the assembly opening 12. When the end wall 22 engages the edge of an opening 12, the elongate arm 32 registers with the other edge of the opening 12 permitting the arm 32 to spring upwardly to the position shown in FIG. 5 in which it abuts against the adjacent end edge of the opening 12. Accordingly, in this position, the end wall 22 abuts against one end edge of the assembly spring 12, while the extended side edge of the elongate arm 32 abuts against the opposite end edge of the assembly opening.

With the fastener applied to the supporting panel 14 in the manner described, it will be noted that the screw-receiving protuberance 16 fits into the assembly opening 12 and the transversely extending portions of the body portion 10 overlap the side edges of the opening 12. Any tendency of the fastener to turn relative to the supporting panel 14 is prevented by the engagement of the end wall 22 and the arm 32 and the respective edges of the assembly opening 12. Thereby, torsional forces applied to the fastener by the insertion therein of a screw which would otherwise cause the fastener to turn and separate from the panel are effectively militated against.

The structure of the elongate arm 32 eliminates problems heretofore encountered with relatively non-yeilding or more rigid fastener structures by enabling both the elongate arm 32 and the portions of the neck 28 interconnecting the end wall 25 and the T-shaped terminal portion 30 to flex with the application of a relatively small amount of force.

The spring arm or tongue 32 makes possible the effective mounting of the fastener or clip upon uneven or deformed panels 14 inasmuch as the tongue 32 automatically adapts or accommodates the clip to an irregular surface. In addition the spring tongue 32 also makes possible the application of the clip to panels of varying thickness so that the usefulness of the fastener is greatly increased as compared to similar fasteners heretofore in use.

As an alternative form the spring arm or tongue 32 may be slightly twisted laterally if desired, in order to present a sharp corner for impingement against the under surface of the supporting panel. This would also have the advantage of reducing the area of contact between the tongue and panel.

It will be readily apparent to one skilled in the art that the fastener or clip defined hereinabove can be easily applied to supporting panels fabricated from soft metals such as aluminum, for example, or to painted or enameled surfaces without fear of excessive marring, scratching, gouging, or otherwise damaging the surfaces thereof. A particularly important feature of the invention resides in the rendering flexible of an otherwise relatively unflexible front mounting clip while not adversely affecting the overall strength characteristics, and incorporating advantages of enabling the mounting of the clip on uneven or deformed panels as well as panels of varying thickness.

According to the patent statutes I have explained the principles and mode of operation of my invention, and have illustrated and described what I know now consider to represent its best embodiment. However, I desire to have it understood that within the scope of the appended claims, the invention may be practiced otherwise than as specifically illustrated and described.

What I claim is:

1. A front mounting clip comprising a sheet metal body, screw thread engaging means carried by said body, and means for attaching said body in a generally rectangular aperture of a supporting panel, said attaching means including a relatively long generally T-shaped neck portion offset from said body and in substantially parallel relation thereto and adapted to engage a surface of the supporting panel opposite to that engaged by said body, said neck portion being of approximately the width of the aperture of the supporting panel, an end wall interconnecting said neck portion with said body, an elongate upwardly inclined resilient tongue projecting above the plane of said neck portion and having one end integral with the fastener, the length of said elongate tongue being equal at least to three times the width thereof, the side edges of said tongue being substantially spaced from the adjacent portions of the body by providing a cut-out portion along each side of said tongue, at least a portion of one of the side edges of said tongue adapted to engage an end wall of the aperture of the supporting panel, the side edges of said tongue being substantially parallel to the end wall of the aperture and a relatively short tongue arm on the opposite side of said body offset therefrom to provide a shoulder to abut against the adjacent end wall of the panel aperture upon engagement of said arm with the opposite end wall of the aperture, whereby the resilient tongue automatically compensates for deformation or unevenness of the supporting panel as well as variations in the thickness thereof.

2. A front mounting clip as claimed in claim 1 in which said resilient tongue is disposed in a plane transverse to the longitudinal dimension of said clip, and said cut-out portions contribute flexibility to said neck portion to facilitate the application of said clip to the supporting panel.

3. A front mounting clip as claimed in claim 1 in which said resilient tongue is disposed crosswise of said neck portion and relatively narrow side strips connect said end wall to the cross portion of the T end of said neck portion whereby said neck portion is flexibly resilient to facilitate the mounting of said clip in the panel aperture.

References Cited by the Examiner

UNITED STATES PATENTS

| | | | |
|---|---|---|---|
| 2,273,648 | 2/42 | Kost | 151—41.75 |
| 2,302,389 | 11/42 | Kost | 151—41.75 |
| 2,572,588 | 10/51 | Bedord | 151—41.75 |
| 2,908,311 | 10/59 | Garman | 151—41.75 |
| 3,073,368 | 1/63 | Meyer | 151—41.75 |

EDWARD C. ALLEN, *Primary Examiner.*